E. HACKETT.
Passenger Register.

No. 46,663.

2 Sheets—Sheet 1.

Patented March 7, 1865.

Witnesses:
Theo Fusch.
Jas P. Hall.

Inventor:
Edward Hackett.

E. HACKETT.
Passenger Register.
No. 46,663.
2 Sheets—Sheet 2.
Patented March 7, 1865.
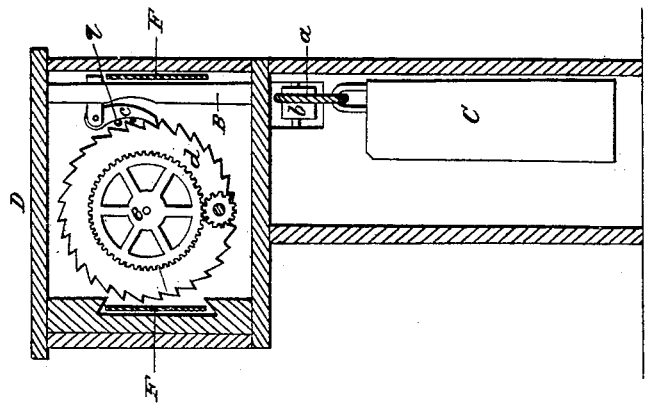
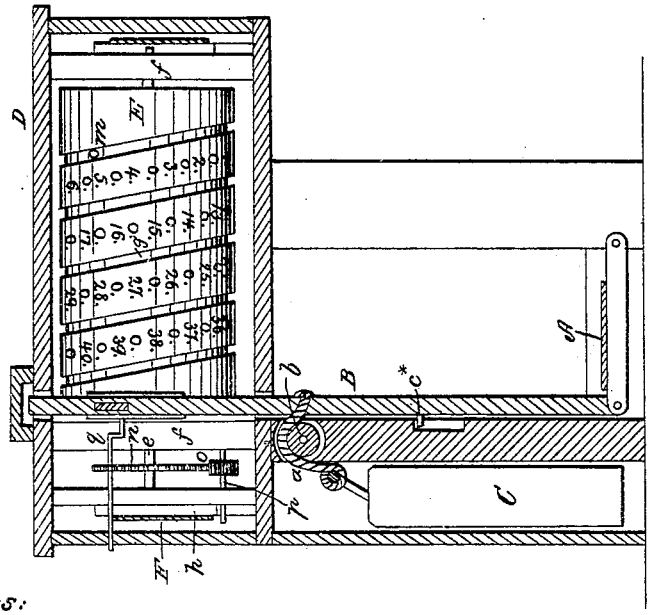
Witnesses:
Theo Fusch
Jas P. Hall.
Inventor:
Edward Hackett.

UNITED STATES PATENT OFFICE.

EDWARD HACKETT, OF NEW YORK, N. Y.

IMPROVEMENT IN PASSENGER-REGISTERS.

Specification forming part of Letters Patent No. 46,683, dated March 7, 1865.

*To all whom it may concern:*

Be it known that I, EDWARD HACKETT, of the city, county, and State of New York, have invented a new and Improved Passenger-Register; and I do hereby declare that the following is a full, clear, and exact description thereof, which will enable those skilled in the art to make and use the same, reference being had to the accompanying drawings, forming part of this specification, in which—

Figure 1:
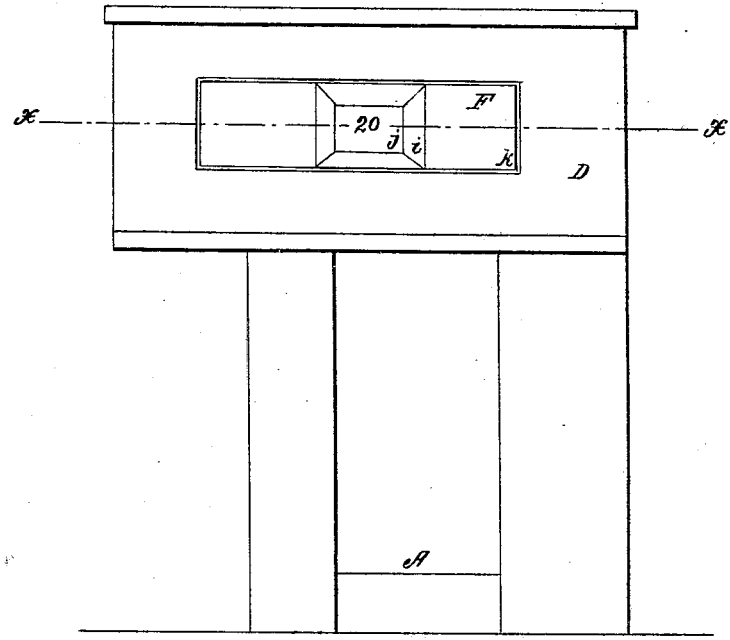
Figure 2:
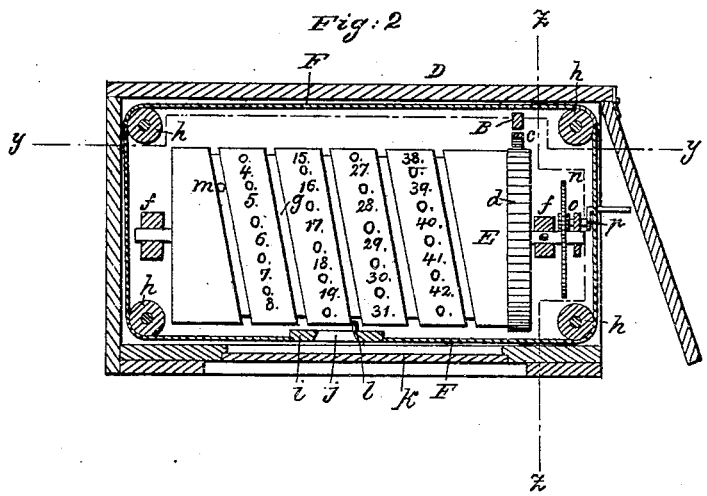

Figure 1 represents a front elevation of this invention. Fig. 2 is a horizontal section of the same, the line $x\,x$, Fig. 1, indicating the plane of section. Fig. 3 is a longitudinal vertical section of the same, taken in the plane indicated by the line $y\,y$, Fig. 2. Fig. 4 is a transverse vertical section of the same, the plane of section being indicated by the line $z\,z$, Fig. 2.

Similar letters of reference indicate corresponding parts.

This invention consists in the employment or use of a roller to which an intermittent rotary motion is imparted by connecting it in a suitable manner with the hinged step of a street-car, omnibus, or other public conveyance, and which is marked on its circumference with a series of figures placed in a spiral row, and also provided with a spiral groove to operate in combination with an endless apron carrying the indicating-slide in such a manner that for each start given to the roller by the weight of a passenger acting on the step the slide is propelled a proportionate distance and a new figure is brought opposite to an opening in said slide, thus indicating the number of passengers passing in and out of the conveyance with perfect accuracy.

A represents the step of a street-car, omnibus, or other public conveyance, said step being made in the usual form and applied in the usual place, but instead of being rigidly supported at both ends it is hinged at one end and its loose end is pivoted to a vertical sliding rod, B, which connects by a rope, $a$, running over a sheave, $b$, with a weight, C. By the action of this weight on the sliding rod the step A is raised to a horizontal position, and said weight is so adjusted that a person stepping on the step depresses the loose end of the same and with it the sliding rod B. If grown persons only are to be registered, the weight must be adjusted accordingly; but if half-grown persons or children are to be registered also, the weight must be reduced to correspond to the weight of the lightest persons to be registered. A suitable stop, $c^*$, projecting from the side of the sliding rod B, prevents the same being depressed beyond a certain limit. If desired, the weight may be replaced by a spring. The sliding rod B carries a pawl, $c$, which is hinged to it near its upper end, and this pawl engages with the teeth of a ratchet-wheel, $d$, that is firmly keyed to the shaft $e$. This shaft has its bearings in uprights $f$, secured in the interior of a box, D. This box is fastened in a convenient position in the interior or on the outside of the street-car, omnibus, or other conveyance, and it is closed on all sides. The shaft $e$ carries a roller, E, the surface of which is provided with a spiral groove, $g$, and the space between the succeeding coils of this groove are marked with a series of figures from 1 to 50, (more or less), alternating with ciphers, as clearly shown in Figs. 2 and 3 of the drawings. The distance between the succeeding figures and ciphers is equal to the pitch of the ratchet-wheel $d$, so that each alternate tooth of said wheel corresponds to one of the figures and the intervening teeth to the ciphers marked on the roller E. Said roller is surrounded by an endless apron, F, which is stretched over four rollers, $h$, placed in a vertical position in the box D, and this apron carries a slide, $i$, which is perforated with an aperture, $j$, through which the figures on the roller E can be seen, the slide $i$ being placed behind a pane of glass, $k$, which is inserted in one of the sides of the box D. From the slide $i$ extends a stud, $l$, into the spiral groove $g$ on the roller, as clearly shown in Fig. 2 of the drawings, and as the roller rotates the spiral groove carries said stud along, and causes the slide $i$ to move from one end of the box D to the other. Stops, $m$, inserted into the groove $g$, arrest the slide at the beginning and end of the series of figures marked on the roller, and in order to turn the roller back at the end of the route, or whenever it may be desirable, a cog-wheel, $n$, is keyed to the axle of the roller B, and a pinion, $o$, mounted on the arbor $p$, gears in this cog-wheel. The arbor $p$ is made square, or otherwise arranged, so that it can be readily connected with a suitable key or handle, or a handle may be permanently attached to the end of said arbor, if desired. In turning the roller back the pawl $c$ must be thrown out of gear with the ratchet-wheel $d$, and this purpose is effected by a small double crank-shaft, $q$, passing through behind said pawl, or in any other suitable and convenient manner. When the roller is turned clear back, the slide $i$ assumes such a position that none of the figures marked on the roller are visible through the aperture $j$, but if the step is depressed and the roller turns one tooth of the ratchet-wheel $d$, the slide is moved along, and the aperture $j$ comes opposite the figure 1, showing that one passenger has gone into the car or other conveyance. If this passenger gets out again, he depresses the step, and the slide $i$ is moved along, bringing the aperture $j$ opposite the cipher between the figures 1 and 2 on the roller, and so for every other passenger getting in and out. At the end of the route the register tells the correct number of passengers which have gone into and out of the car, omnibus, or other conveyance.

I claim as new and desire to secure by Letters Patent—

The roller E, provided with a spiral groove, $g$, and marked with alternating figures and ciphers placed in a spiral row, to operate in combination with the slide $i$ and with the hinged step A, sliding rod B, and weight C, or its equivalent, in the manner and for the purpose substantially as set forth.

EDWARD HACKETT.

Witnesses:
J. P. HALL,
THEO. TUSCH.